United States Patent [19]

Matsushima et al.

[11] 4,345,003

[45] Aug. 17, 1982

[54] RESOL PHENOLIC RESIN BINDER FOR HOT COATING OF FOUNDRY SAND

[75] Inventors: Noriaki Matsushima; Shigeru Nemoto, both of Fujieda, Japan

[73] Assignee: Sumitomo Durez Company, Ltd., Japan

[21] Appl. No.: 212,936

[22] Filed: Dec. 4, 1980

Related U.S. Application Data

[63] Continuation of Ser. No. 29,501, Apr. 12, 1979, abandoned.

[30] Foreign Application Priority Data

Apr. 18, 1978 [JP] Japan .................................. 53-44783

[51] Int. Cl.$^3$ ........................ B32B 27/14; B05D 7/00; C08L 91/06
[52] U.S. Cl. .................................. 428/327; 106/38.2; 106/38.6; 164/526; 164/527; 427/215; 427/221; 428/372; 428/397; 428/403; 428/404; 428/407; 523/145
[58] Field of Search ............... 428/403, 404, 405, 407, 428/427, 327, 372, 399, 397, 454, 484, 524; 427/221, 215; 106/38.2, 38.6; 164/43, 526, 527; 260/28 P, 38, 37 R, 39 R, 33.4 R

[56] References Cited

U.S. PATENT DOCUMENTS

| | | | |
|---|---|---|---|
| 2,632,745 | 3/1953 | Smith | 260/33.4 R |
| 2,878,539 | 3/1959 | Halpern et al. | 164/43 |
| 2,923,989 | 2/1960 | Thomson | 260/38 |
| 2,934,511 | 4/1960 | Auerbach et al. | 260/38 |
| 2,943,068 | 6/1960 | Freedman | 260/38 R |
| 3,734,936 | 5/1973 | Brown et al. | 260/37 R |
| 3,917,555 | 11/1975 | Worschech et al. | 260/39 R |
| 3,944,514 | 3/1976 | Nishiyama et al. | 260/38 R |
| 4,073,761 | 2/1978 | Bowman et al. | 260/38 R X |
| 4,157,993 | 6/1979 | Funabiki et al. | 260/28 P |
| 4,196,114 | 4/1980 | Funabiki et al. | 260/28 P |

*Primary Examiner*—Thomas J. Herbert, Jr.
*Attorney, Agent, or Firm*—James F. Tao; James F. Mudd

[57] ABSTRACT

A phenolic resin binder useful for hot coating foundry sand and comprising a mixture of a solid resol phenolic resin and a lubricant is provided in the form of beads or rods of diameter of about 0.5 to 7 mm and a length of about 0.5 to 30 mm. The beads or rods can be formed directly from a molten mixture of the components or the molten mixture can first be solidified and thereafter formed into such beads or rods. The process for the hot coating of foundry sand with the phenolic resin binder and the resulting foundry compositions, molds and cores are also disclosed.

16 Claims, No Drawings

RESOL PHENOLIC RESIN BINDER FOR HOT COATING OF FOUNDRY SAND

This is a continuation of application Ser. No. 029,501, filed Apr. 12, 1979, now abandoned.

BACKGROUND OF THE INVENTION

The present invention relates to an improvement on a binder for hot coating foundry sand containing a solid resol phenolic resin as principal ingredient thereof.

The resin coated sand obtained by the hot coating method has conventionally been prepared by mixing a novolak phenolic resin (hereinafter referred to as novolak resin) with heated sand particles, adding under agitation an aqueous solution of hexamethylene tetramine (hereinafter referred to as hexamine) as a hardener in an amount of up to about 15 percent by weight, usually about 10 to 15 percent by weight with respect to the resin, and further adding calcium stearate. The resin coated sand thus prepared with a novolak resin and hexamine is advantageous in having a fast hardening speed and a high flowability, but the hexamine employed in this process is thermally decomposed during the mold formation or when casting metal to form nitrogen compounds such as ammonia or formaldehyde, thus leading to a pollution problem, and the nitrogen compounds resulting from thermal decomposition of hexamine give rise, when applied to iron or steel casting, to defects such as pinholes or blow holes in the cast products. In order to avoid such drawbacks there has been proposed the use, in the hot coating method, of various binders with very low content of nitrogen or completely free from nitrogen. As one of such binders there was an attempt, already 20 years ago, of the use of a solid resol phenolic resin (hereinafter referred to as solid resol resin) alone as the binder for the hot coating method. Such material is however deficient in comparison with the system of novalak resin and hexamine in slower resin hardening speed and still in a partial hardening phenomenon of the resin occurs while the sand particles were not sufficiently coated during the mixing step, thus leading to an insufficient resin flow (insufficient hot flowability). As a result the formed product shows a strength significantly lower than that obtainable in the system of novolak resin and hexamine and has not, therefore, been employed in practical use. Said material has however attracted attention again as a solution for the gas defects such as pinholes or blow holes and the polluting disagreeable odor at mold formation or metal casting, resulting from the use of hexamine as explained in the foregoing.

It has already been disclosed in copending patent application Ser. No. 865,558, filed Dec. 29, 1977 now U.S. Pat. No. 4,196,114, the disclosure of which is incorporated herein by reference, that the above-mentioned drawbacks can be avoided by adding a lubricant to the solid resol resin. The effect of said addition is quite significant, but the present inventors have found that said effect can be further improved by forming the solid resol resin into a suitable shape and have thus achieved the present invention.

SUMMARY OF THE INVENTION

The object of the present invention is to provide a formed solid resol resin binder for use in the hot coating method, which is easy to manufacture, is free from agglomeration, easily allows automatic weighing and feeding, is far less friable, is provided with high reactivity and can thus be supplied stably with low cost, and which provides a resin coated sand showing satisfactory strength and fast hardening property resulting from high hot flowability and thus contributing to prevention of gas defects in cast metals and in averting pollution problems.

Thus the present invention is featured by a resol phenolic resin solid binder for hot coating solidified from a melted mixture of a solid resol resin and a lubricant and formed into beads or rods of a diameter of about 0.5 to 7 mm and of a length of about 0.5 to 30 mm.

The above-mentioned binder is a formed solid resol resin containing a lubricant in a resin obtained by reacting 1 mole of a phenol with 1 mole or more up to 3 moles of an aldehyde such as formaldehyde in the presence of an alkaline catalyst. Said solid resol resin itself can be a solid resol resin obtained with an amine catalyst such as ammonia or an amine compound, or a solid resol resin obtained with a combined catalyst composed of an amine catalyst and an alkali metal catalyst, or a solid resol resin obtained with an alkali metal catalyst.

DESCRIPTION OF EMBODIMENTS

The phenol to be employed herein is phenol, an alkylphenol such as m-cresol or p-cresol or xylenol, or a mixture thereof. Also phenol modified with a modifier reactive with formaldehyde such as resorcinol, aniline, urea, melamine, bisphenol-A, cashew nut shell oil, xylene formaldehyde resins, epoxy resins etc. are included in the present invention.

The formaldehyde to be employed herein includes not only formalin but also polymers of formaldehyde functioning as a source for generating formaldehyde, such as paraformaldehyde or trioxane, or a mixture thereof. Other aldehydes of 1 to 8 carbon atoms can be used, such as acetaldehyde, propionaldehyde, butyraldehyde and the like can be used. Also hexamine is not only usable as a catalyst but also as a part of the formaldehyde source.

Examples of amine compounds usable as amine catalysts are monomethylamine, triethylamine, ethanolamine and aniline. Examples of alkali metal catalysts are hydroxides or oxides such as sodium, potassium or lithium, and hydroxides or oxides of alkali earth metals such as barium, calcium or magnesium. Such alkali catalyst is added, in certain cases, portion-wise to the reactor.

Examples of said lubricants are carnauba wax, Montana wax, paraffin wax, polyethylene wax, fatty acid amides such as ethylene bisstearyl amide, methylene bisstearyl amide, oxystearyl amide or linoleyl amide, and fatty acid salts such as calcium stearate. Preferably the lubricant is composed of a fatty acid amide with a melting point higher than 100° C. such as ethylene bisstearyl amide, methylene bisstearyl amide, oxystearyl amide or stearyl amide, or polyethylene wax. The lubricant-containing binder can be obtained by adding said lubricant prior to, during or after the reaction of solid resol resin. Also said lubricant can be added in the form of a dispersion. Said lubricant is preferably added in an amount of about 0.5 to 10% by weight with respect to the solid resol resin, as an amount in excess of 10% by weight increases the viscosity and thus renders the preparation of resin difficult. The more preferred amount of addition is 1 to 7% by weight in consideration of the hot flowability, hardening speed and strength.

The formed binder of the present invention is generally formed into beads or rods having a diameter of about 0.5 to 7 mm and a length of about 0.5 to 30 mm. But in order to meet automatic weighing devices, and to improve, hot flowability of sand particles, and both strength and productivity of mold, the beads are preferably provided with a diameter of about 1 to 5 mm while the rods are preferably provided with a diameter of about 1 to 5 mm and a length of about 1 to 15 mm.

The term bead used in the present invention includes but is not limited to spherical, hemi-spherical, oval, elipsoid or tablet shapes. Also rods of the present invention are not limited to those of a circular cross section but include those of other cross-sectional forms such as square, semi-circular or oval form.

In the following there will be given an explanation of the process for producing the formed binder of the present invention. At first 1 mole of phenol and 1 to 3 moles of formaldehyde are charged in a reactor, to which an alkali catalyst is added. (If desired the lubricant is also added). The contents of the reactor are reacted for about 30 minutes to 2 hours at a temperature of 50° to 100° C. (The lubricant is preferably added after this condensation or dehydration reaction). Then dehydration is conducted under reduced pressure and at a temperature lower than 100° C. to obtain the reaction product (resol). (The lubricant is added at this point in certain cases). The melted resol resin containing the lubricant is subjected to extrusion to obtain the formed solid resol resin binder containing lubricant. In another process, the resol resin containing the lubricant is removed from the reactor, solidified by rapid cooling, then crushed and further subjected to extrusion or compression process to obtain the formed binder. In still another process, the reaction product without the addition of lubricant during the course of reaction is removed from the reactor, solidified by rapid cooling, then crushed, added with the lubricant (i.e. after the completion of reaction) and subjected to extrusion or compression process to obtain the formed binder. As explained in the foregoing the lubricant may be added at any desired stage, but the addition during the course of reaction is preferred in view of achieving a uniform dispersion.

The forming process in the present invention will be further explained in the following. The extrusion molding can be achieved by various extrusion/pelletizer combinations, among which a multiple-screw type extrusion/pelletizer, which extrudes and pelletizes the binder resin through a die by means of the pressure of multiple-screws, may be advantageously used for the forming process in the present invention. The diameter and length of the formed binder can be arbitrarily controlled by the diameter of die openings and cutting speed. Also the shape of the formed binder can be readily controlled. For example the shape of the formed binder becomes rounder with hot-cutting than cold-cutting, and the binder can be formed into beads for example by vibration after such hot-cutting. Since the binder itself is thermosetting, the temperature of extrusion should be as low as possible, for example from about 80° C. to about 90° C., and should not exceed about 95° C. On the other hand, compression process is also usable in the present invention, though it is inferior in productivity to the above-mentioned extrusion process.

The resol resin of the present invention can also be prepared for example by reacting phenol and formaldehyde at first with an acid catalyst and then with an alkali catalyst. In a more preferred embodiment of the present invention, there is employed a combination of ammonia and an alkali metal catalyst to obtain a faster hardening speed. Also the addition of a silane coupling agent is preferred for improving moisture resistance.

In order to achieve a still faster hardening speed, it is also possible, within the scope of the present invention, to add, prior to the forming, already known hardening accelerators for examples phenols such as bisphenol-A or resorcinol, organic acids such as salicylic acid or benzoic acid; alkali metals or salts thereof such as calcium hydroxide, barium hydroxide or calcium chloride; or aromatic amines such as phenylene diamine, aminosalicylic acid or aminophenol.

The formed binder of the present invention and the resin coated sand prepared therefrom are free from the drawbacks of causing gas defects of the metal products and of releasing polluting disagreeable odor, and the solid state of the binder provides an improved storage stability of the resin in comparison with liquid resol resin. In addition there are provided following advantages:

(1) Though the lubricant-containing binder has a higher apparent melting point, than the conventional solid resol resin, due to the presence of the included lubricant of a higher melting point, and therefore has a basically improved anti-agglomerating property. This property can be further improved by forming the binder into beads or rods without the presence of fine powder as disclosed in the present invention. It is therefore rendered possible to retain the reaction of resin at a preliminary stage, (namely to obtain a solid resol resin with increased number of methylol radicals), thereby increasing the hardening speed and obtaining a high-density resin coated sand with increased crosslinking and with reduced tendency of causing peel-back.

(2) The lubricant substantially homogeneously dispersed in the solid resol resin provides satisfactory hot flowability and satisfactory wetting of sand particles, thereby enabling to provide resin coated sand of high mold strength, but these properties can be further improved by forming the binder into certain shapes.

(3) The binder formed into beads or rods without the presence of fine powder can be easily handled in an automatic weighing device or in an automatic feeding device, and the reduced powdering phenomenon prevents dust formation in the blending step and eliminates loss of the binder (the strength is unfavorably affected if the fine powder is present in a larger amount):

(4) Also the present invention facilitates the control of reaction for the preparation of resin and for the forming process due to the presence of added lubricant, and almost or completely eliminates the necessity of adding calcium stearate at the preparation of resin coated sand, thereby allowing to simplify the blending operation. Also the hardening property can be easily controlled by the use of a hardening accelerator.

The present invention will be further clarified by the following non-limitative examples, in which the quantities and percentages are respectively represented by parts by weight and percent by weight unless otherwise specified.

EXAMPLE 1

2000 Parts of phenol and 2590 parts of 37% formalin were charged in a reactor, and, after the addition of 160 parts of 28% aqueous solution of ammonia and 60 parts of 50% aqueous solution of sodium hydroxide, the mixture was gradually heated. After a reaction under reflux for 30 minutes after the temperature reached 100° C., 80 parts of ethylene bisstearyl amide (corresponding to 3.6% with respect to solid resol resin) was added and dispersed, and dehydration reaction was conducted under a reduced pressure of 30–50 mmHg. The resulting resin was successively cooled, and, at a temperature of 80° C., charged alternately to two twin-screw extruders, from which the resin was extruded through dies under air-cooling and cut into a length of 8 mm to obtain a rod-formed binder with a diameter of 4 mm.

The following extrusion temperatures were employed.

|  | Feed Hopper | Zone A | Zone B | Die Plate |
| --- | --- | --- | --- | --- |
| Setting Temperature, °C. | 60 | 60 | 70 | 65 |
| Stock Temperature, °C. | 81 | 82 | 86 | 91 |

EXAMPLE 2

The process of Example 1 was reproduced except that ethylene bisstearyl amide was added in an amount of 140 parts (corresponding to 6.2% with respect to the solid resol resin) to obtain a uniformly rod-formed binder of a diameter of 4 mm and a length of 8 mm.

EXAMPLE 3

2000 Parts of phenol and 2590 parts of 37% formalin were charged in a reactor, and, after the addition of 160 parts of 28% aqueous solution of ammonia and 60 parts of 50% aqueous solution of sodium hydroxide, the mixture was gradually heated. After a reaction under reflux for 30 minutes after the temperature reached 100° C., 80 parts of ethylene bisstearyl amide was added and dispersed, and dehydration was conducted under reduced pressure. The resulting resin was successively cooled, then, at a temperature of 80° C., taken out from the reactor, rapidly cooled and crushed to obtain a powdered binder. The powdered binder thus obtained was extruded under air-cooling from a twin-screw extruder with a die provided with multiple holes of 4 mm in diameter and the extrudate cut into a length of 7 mm thereby obtaining a rod-formed binder of a diameter of 4 mm.

EXAMPLE 4

The process of Example 3 was reproduced except that the binder was extruded from a twin-screw extruder with a die provided with multiple holes of 3 mm in diameter, then the extrudate was subjected to hot-cutting and air-cooled, to obtain a bead-form (rice shaped) binder of a diameter of 3 mm and a length of 4 mm.

EXAMPLE 5

2000 Parts of phenol and 2590 parts of 37% formalin were charged into a reactor, and, after the addition of 160 parts of 28% aqueous solution of ammonia, the mixture was gradually heated. After a reaction under reflux for 30 minutes after the temperature reached 100° C., 80 parts of ethylene bisstearyl amide was added and dispersed, and dehydration was conducted under reduced pressure. The resulting resin was successively cooled, then at a temperature of 80° C., taken out from the reactor, rapidly cooled and crushed to obtain a powdered binder. The powdered binder thus obtained was treated in a similar manner as described in Example 3 to obtain a rod-formed binder of a diameter of 4 mm and a length of 7 mm.

In the foregoing Examples 3, 4 and 5, the following extrusion temperatures were employed.

|  | Feed Hopper | Zone A | Zone B | Die Plate |
| --- | --- | --- | --- | --- |
| Setting Temperature, °C. | 75 | 90 | 90 | 80 |
| Stock Temperature, °C. |  |  |  |  |
| Example 3 | 48 | 80 | 84 | 91 |
| Example 4 | 46 | 78 | 85 | 90 |
| Example 5 | 51 | 79 | 85 | 91 |

EXAMPLE 6

The process of Example 5 was reproduced except that 33 parts of bisphenol-A was added as a hardening accelerator to the powdered binder prior to the forming step thereof, to obtain a formed binder of a diameter of 4 mm and a length of 7 mm.

EXAMPLE 7

2000 Parts of phenol and 2590 parts of 37% formalin were charged into a reactor, and, after the addition of 160 parts of 28% aqueous solution of ammonia, the mixture was gradually heated. After a reaction under reflux for 30 minutes after the temperature reached 100° C., the reaction product was subjected to dehydration under reduced pressure, then taken out from the reactor at a temperature of 85° C., successively cooled rapidly and crushed to obtain a powdered binder. A mixture of 2000 parts of thus obtained powdered binder and 72 parts of ethylene bisstearyl amide was extruded from a twin-screw extruder provided with a multiple-holed die with apertures of 4 mm in diameter, air-cooled and cut into a length of 7 mm to obtain a rod-formed binder of a diameter of 4 mm and a length of 7 mm.

Although the lubricant in the foregoing Examples 1 to 7 was composed solely of ethylene bisstearyl amide, a similar effect of addition could be obtained with other fatty acid amides such as methylene bisstearyl amide, oxystearyl amide or stearyl amide. Also a substantially same result could be observed in the case of using polyethylene wax.

CONTROL EXAMPLE 8

2000 Parts of phenol and 2590 parts of 37% formalin were charged in a reactor, and, after the addition of 160 parts of 28% aqueous solution of ammonia, the mixture was gradually heated. After a reaction under reflux for 30 minutes after the temperature reached 100° C., 80 parts of ethylene bisstearyl amide was added and dispersed and successively dehydrated under reduced pressure. The resulting product was taken out from the reactor at a temperature of 85° C., then cooled rapidly and crushed to obtain the binder in a form of crushed particles.

CONTROL EXAMPLE 9

The process of the Example 3 was reproduced except that the binder was extruded from a twin-screw extruder provided with a multiple-holed die with apertures of 7 mm in diameter, to obtain a rod-formed binder of a diameter of 8 mm and a length of 40 mm.

CONTROL EXAMPLE 10

In the process of Control Example 8, the addition of ethylene bisstearyl amide was omitted and the resulting product was taken out from the reactor at 95° C., then cooled rapidly and crushed in a hammer mill to obtain the binder in a form of crushed particles.

The handling properties of the solid resol resin binders prepared in the foregoing Examples and Control Examples as bulk materials are summarized in the following Table 1:

TABLE 1

| PROPERTY | PROPERTIES OF BINDERS EXAMPLE | | | | | | | | | |
|---|---|---|---|---|---|---|---|---|---|---|
| | 1 | 2 | 3 | 4 | 5 | 6 | 7 | 8 | 9 | 10 |
| Anti-agglomeration | o | o | o | o | o | o | o | o | o | x |
| Friability resistance | o | o | o | o | o | o | o | x | o | x |

Note:
Anti-agglomeration: 15 kgs. of binder was packed in a polyethylene-lined paper bag and placed under a load of 200 kgs. at 30° C. to evaluate its relative lumping property:
x: agglomeration within 5 days
o: no agglomeration within 30 days
Friability resistance: Various binders were transported under a pressure of 2 kg/cm$^2$ through a pipe of an internal diameter of 50 mm and including a U-shaped pipe, and the binder thus transported was collected at the end of said pipe to evaluate the rate of friability:
x: friability more than 50%
o: friability less than 15%

In order to evaluate the practical binding properties of the products prepared in the foregoing Examples and Control Examples, samples of resin-coated sand were prepared therefrom in the following manner.

"Sanei" shell sand was heated to 130°–140° C. and charged into a Wahr mixer and mixed for 40 seconds with a binder in an amount of 3% with respect to said sand. Higher and lower proportions of resin can be employed, for example about 1 to 5 percent with respect to the sand. Successively cooling water of an amount of 1.5% with respect to said sand was added and blended until the lumps of coated sand were broken. Then calcium stearate of an amount of 0.05% with respect to said sand was added and blended for 20 seconds. The resulting product was taken out from the mixer and aerated to obtain the corresponding resin coated sand, of which properties are summarized in the following Table 2. The properties shown in Table 2 were determined as follows:

Bending strength (kg/cm$^2$): JACT test method SM-1
Stick point (°C.): JACT test method C-1
Hot tensile strength (kg/cm$^2$): JACT test method SM-10.

TABLE 2

| PROPERTIES | PROPERTIES OF THE RESIN COATED SAND RESIN OF EXAMPLES | | | | | | | | | |
|---|---|---|---|---|---|---|---|---|---|---|
| | 1 | 2 | 3 | 4 | 5 | 6 | 7 | 8 | 9 | 10 |
| Form | Rod | Rod | Rod | Bead | Rod | Rod | Rod | Irregular particle | Rod | Irregular particle |
| Size Diameter (mm) | 4 | 4 | 4 | 3 | 4 | 4 | 4 | — | 8 | — |
| Length (mm) | 8 | 8 | 7 | 4 | 7 | 7 | 7 | Irregular | 40 | Irregular |
| Bend strength (kg/cm$^2$) | 58.8 | 58.0 | 58.9 | 59.2 | 56.2 | 54.8 | 55.6 | 51.2 | 49.3 | 35.4 |
| Adhesion point (°C.) | 101 | 99 | 102 | 102 | 101 | 102 | 103 | 101 | 103 | 104 |
| Hot tensile strength (kg/cm$^2$) | | | | | | | | | | |
| 30 sec. | 4.2 | 3.8 | 3.6 | 4.1 | 3.0 | 4.3 | 2.9 | 2.3 | 2.4 | 1.3 |
| 60 sec | 10.2 | 10.1 | 10.7 | 10.9 | 8.8 | 11.4 | 8.6 | 8.3 | 8.4 | 5.4 |
| 240 sec | 23.5 | 22.4 | 22.7 | 23.7 | 22.2 | 21.0 | 21.7 | 20.6 | 19.8 | 16.8 |

We claim:

1. A phenolic resin binder in the form of discrete, molded particles useful for hot coating foundry sand, said molded particles comprised of a mixture of solid resol phenolic resin and a lubricant substantially homogeneously dispersed therein, said discrete, molded particles being in the form of beads having a diameter of about 1 to 5 mm or rods having a diameter of about 1 to 5 mm and a length of about 1 to 15 mm.

2. A binder according to claim 1 wherein said mixture in molten form is formed directly into said beads or rods.

3. A binder according to claim 1 wherein said mixture in molten form is solidified and thereafter formed into said beads or rods.

4. A binder according to claim 1 which contains said lubricant in an amount of about 0.5 to 10% by weight with respect to said solid resol phenolic resin.

5. A binder according to claims 1 or 4 wherein the solid resol phenolic resin comprises a hardening accelerator.

6. A binder according to claim 4 which contains a lubricant in an amount of about 1 to 7% by weight with respect to said solid resol phenolic resin.

7. A binder according to claim 4 further comprising a silane coupling agent.

8. A binder according to claim 6 wherein said lubricant is polyethylene wax.

9. A binder according to claim 6 wherein said lubricant is a fatty acid amide.

10. A binder according to claim 9 wherein said lubricant is selected from the group consisting of ethylene bisstearyl amide, methylene bisstearyl amide, oxystearyl amide and stearyl amide.

11. A process for producing resin-coated sand which comprises coating heated sand particles with the binder of claim 1.

12. A foundry sand composition useful as a foundry sand core or mold prepared by the process of claim 11.

13. A process for producing resin-coated sand according to claim 11 wherein said binder is employed in a proportion of about 1 to about 5 percent by weight of said foundry sand.

14. A foundry sand composition useful as a foundry sand core or mold prepared by the process of claim 13.

15. The process of claim 13 wherein said binder contains said lubricant in an amount of about 0.5 to 10 percent by weight with respect to said solid resol phenolic resin.

16. A foundry sand composition useful as a foundry sand core or mold prepared by the process of claim 15.

* * * * *